(12) United States Patent
Mimura et al.

(10) Patent No.: US 6,782,992 B2
(45) Date of Patent: Aug. 31, 2004

(54) VIBRATORY PARTS-FEEDING UNIT

(75) Inventors: Taro Mimura, Shiojiri (JP); Hironobu Nonaka, Nagoya (JP)

(73) Assignees: Daisin Co., Ltd. (JP); Sanki Co., Ltd. (JP)

( * ) Notice: Subject to any disclaimer, the term of this patent is extended or adjusted under 35 U.S.C. 154(b) by 0 days.

(21) Appl. No.: 10/205,376

(22) Filed: Jul. 25, 2002

(65) Prior Publication Data

US 2003/0132085 A1 Jul. 17, 2003

(30) Foreign Application Priority Data

Jan. 15, 2002 (JP) ........................................ 2002-005926

(51) Int. Cl.[7] ............................................. B65G 47/12
(52) U.S. Cl. ........................................................ 198/443
(58) Field of Search ................................. 198/443, 453, 198/580, 609

(56) References Cited

U.S. PATENT DOCUMENTS

| | | | | | |
|---|---|---|---|---|---|
| 2,891,668 | A | * | 6/1959 | Hunt | 198/443 |
| 2,939,567 | A | * | 6/1960 | Mazura et al. | 221/12 |
| 4,175,654 | A | * | 11/1979 | Lodge | 198/398 |
| 5,105,930 | A | | 4/1992 | Spatafora et al. | |
| 5,207,312 | A | * | 5/1993 | Takahashi et al. | 198/600 |
| 6,374,985 | B1 | * | 4/2002 | Nakashima et al. | 198/391 |

FOREIGN PATENT DOCUMENTS

| | | |
|---|---|---|
| AT | 341 426 B | 10/1978 |
| JP | S55-106913 A | 8/1980 |
| JP | 58 104813 A | 6/1983 |
| JP | S63-277117 A | 11/1988 |
| JP | S64-1194 B2 | 1/1989 |
| JP | H01-34895 BR | 7/1989 |

OTHER PUBLICATIONS

English translation of abstract of JP 58 104813A, issued Jun. 22, 1983.

* cited by examiner

*Primary Examiner*—Richard Ridley
(74) *Attorney, Agent, or Firm*—Cook, Alex, McFarron, Manzo, Cummings & Mehler, Ltd.

(57) ABSTRACT

The invention provides a vibratory parts-feeding unit wherein downsizing and an improvement in performance of the unit can be compatible and also an improvement in maintainability and a reduction in motion failure is possible. A vibratory parts-feeding unit (100) comprises a vibrating body 113 provided with a spiral parts-lifting path (133*a*) on the outer circumference thereof, a first linear-feeder (130) which receives parts at a parts-sending portion (133*c*) of the parts-lifting path (133*a*), and a second linear-feeder (140) having a parts-collecting path (145) for receiving parts rejected from a parts-feeding path (135) provided on the first linear-feeder (130). The parts-collecting path (145) is installed in parallel with the parts-feeding path (135) and is also, throughout its whole length, arranged lower than the parts-feeding path (135).

20 Claims, 6 Drawing Sheets

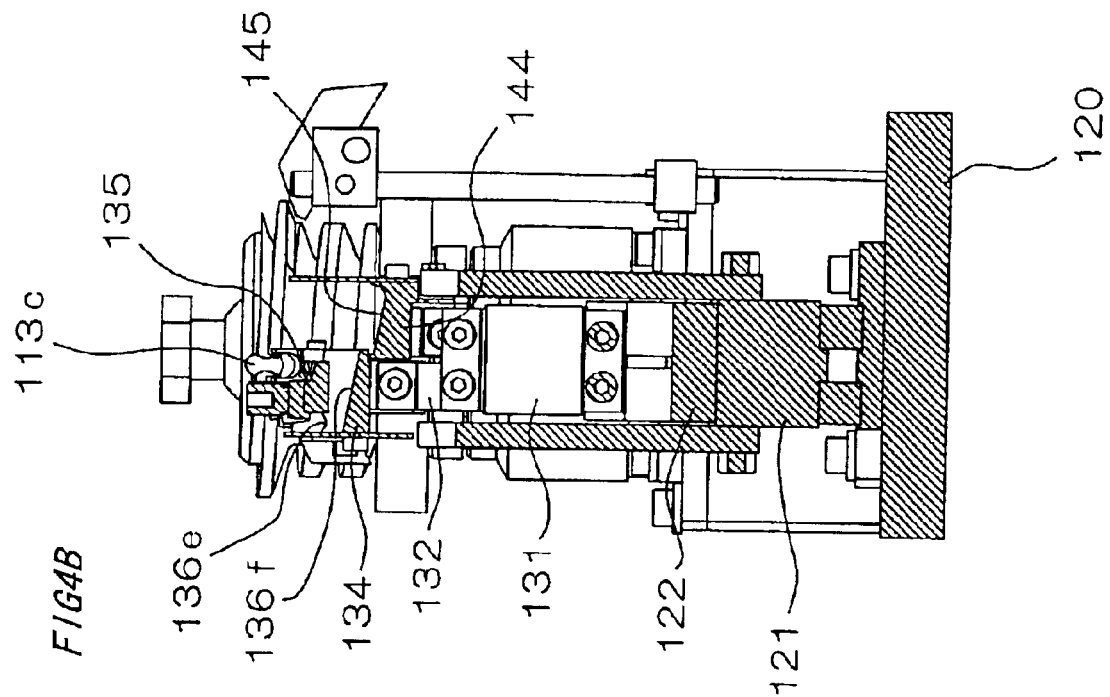
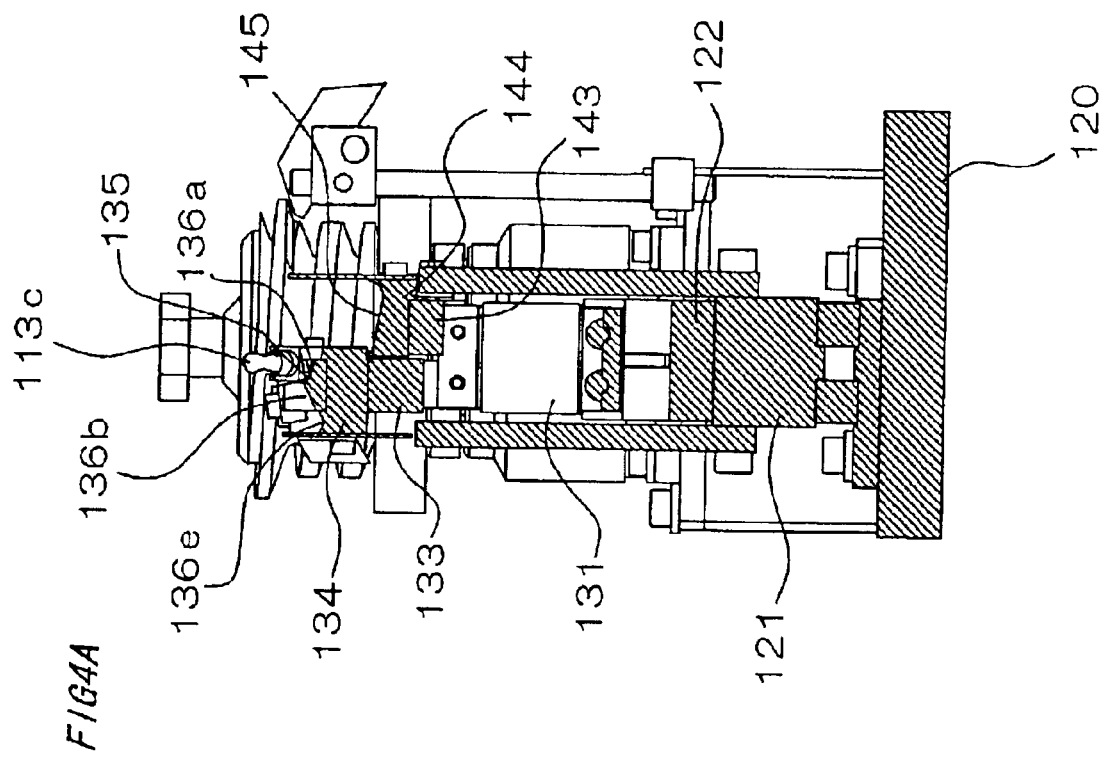

VIBRATORY PARTS-FEEDING UNIT

BACKGROUND OF THE INVENTION

The present invention relates to a vibratory parts-feeding unit and, in particular, to a parts-feeding unit having a pair of linear-transferring means for transferring, by vibration, parts in mutually opposite directions.

In general, as a vibratory parts-feeding unit, which transfers and feeds minute parts by vibration, a parts-feeding unit, which is constructed by connecting a vibratory linear-feeder is connected to the exit of a vibratory parts-feeder having a bowl-shaped vibrating tray, is known. In this parts-feeding unit having a bowl-shaped vibratory parts-feeder, a spiral parts-feeding path is formed inside the vibrating tray, and at a part of this parts-feeding path, a parts-screening portion for making the posture of parts uniform or screening the parts quality is provided.

However, in this parts-feeding unit having a bowl-shaped parts-feeder, since it is necessary to provide a parts-screening portion on a spiral parts-feeding path, the vibrating tray itself having the spiral parts-feeding path becomes expensive, moreover, respective components of the parts-screening portion, which is fabricated in response to this parts-feeding path, also become expensive. Therefore, a problem exists such that a reduction in manufacturing cost is difficult. In addition, if an improvement in parts-feeding ability is intended in this unit, it is necessary to enlarge the diameter of the vibrating tray. Furthermore, in this unit, in order to transfer and mount aligned parts from the bowl-shaped parts feeder to the linear feeder, the linear-feeder which linearly vibrates must be connected and arranged in a condition where a minute distance is provided with respect to the vibrating tray which vibrates in the tangential direction (in a twisted motion). However, since high accuracy is required for this connection area, assembly and maintenance are difficult, and a problem also exists such that parts-feeding path is easily clogged with parts at the connection area.

Therefore, in place of such a former expensive parts-feeding unit having a bowl-shaped parts feeder whose installation area is great considering its parts-feeding ability as described above, in recent years, a successor circulating parts-feeding unit, which is low cost and downsizable, has received considerable attention. This circulating parts-feeding unit is of a construction such that a pair of vibratory linear feeders which transfer parts in the mutually opposite directions is closely juxtaposed, parts are fed by one of the linear feeders (feeding linear feeder), and parts rejected from a parts-screening portion in a feeding process of these parts are received by the other linear feeder (collecting linear feeder) and transferred in the opposite direction so as to return the upstream side of the feeding linear feeder. In further detail, a construction is provided, wherein a parts-screening portion is provided at a position on the downstream side of a parts-feeding path of the feeding linear feeder so that parts rejected from the parts-feeding path in a process for aligning parts are guided to a position on the upstream side of a parts-collecting path of the collecting linear feeder, and a construction is provided, wherein a parts feedback portion is provided at a position on the downstream side of the parts-collecting path of the collecting linear feeder so that parts are returned from this parts returning portion to a position on the upstream side of the parts-feeding path of the feeding linear feeder. This type of unit is disclosed in the Japanese Patent Opening Gazette No. 1998-175724, No. 2001-63816 (this is corresponding to U.S. Pat. No. 6,374,985), and Japanese Patent No. 1988-53084.

However, in the above circulating parts-feeding unit, if a pair of linear-feeders having mutually opposite transferring directions is juxtaposed, it is necessary to construct both linear feeders so as not make contact with each other and, in order to enable parts delivery (transfer) between the pair of linear feeders, it is also necessary to provide a construction with a crossing arrangement such that the upstream side of the parts-collecting path of the collecting linear-feeder is arranged slightly downward the downstream side of the parts-feeding path on the feeding linear feeder and the downstream side of the parts-collecting path is arranged slightly above the upstream side of the parts-feeding path. Accordingly, with respect to the whole length of the pair of linear feeders, the length of a range of the parts-screening portion, that is, a range where parts can be rejected from the feeding linear feeder to the collecting linear feeder is limited, therefore, a problem exists such that downsizing of the unit and performance (parts screening ability) of the unit are hardly compatible, for example, in some cases, parts-feeding ability declines and inferior parts-screening increases.

In addition, as in the above, since the pair of linear feeders mutually cross when viewed in the up-and-down direction, portions of the feeding linear-feeder and collecting linear feeder; which are mutually opposed with a slight distance in the horizontal direction, inevitably exist at a cross point. Therefore, maintainability is poor and a problem also exists such that parts and/or dust drops and clogging in the gap between such opposed portions, causing a motion failure of vibrating movement in both of linear feeders.

Furthermore, as described in the above, in the pair of linear feeders of a crossing arrangement, when one of the parts-feeding path of the feeding linear-feeder or the parts-collecting path of the collecting linear-feeder is constructed to become horizontal, the other is accordingly arranged with an inclination so as to become an upslope toward a parts transferring direction. Therefore, problems also exist such that a feeding rate at the parts-feeding path declines or the flow ability of parts on the parts-collecting path becomes low.

DISCLOSURE OF THE INVENTION

Therefore, the present invention is made to solve the above problems, and it is an object thereof to provide a vibratory parts-feeding unit wherein downsizing and an improvement in performance of the unit can be compatible. In addition, it is an object to provide a parts-feeding unit wherein an improvement in maintainability and a reduction in motion failure is possible. Furthermore, it is an object to provide a parts-feeding unit wherein an improvement in parts feeding ability is possible.

In order to achieve the above objects, a vibratory parts-feeding unit of the present invention comprises:

(a) first linear-transferring means for screening and feeding parts while transferring the parts along a parts-feeding path by vibration, (b) parts-lifting means for raising parts from a parts-receiving portion located downward and feeding the parts to the upstream side of said first linear-transferring means by a parts-sending portion located upward, and (c) second linear-transferring means which has a parts-collecting path, receives parts rejected from said parts-feeding path, and transfers the parts in a direction opposite to that of said first linear-transferring means along said parts-collecting path by vibration to return the parts to said parts-receiving portion of said parts-lifting means.

According to this invention, in the process where parts are fed along the parts-feeding path of the first linear-transferring means, parts rejected from the parts-feeding path through parts-screening are transferred and mounted onto the parts-collecting path of the second linear-transferring means, transferred along the parts-collecting path in the direction opposite to a parts feeding direction, and returned to the parts-receiving portion of the parts-lifting means. Therefore, the parts are furthermore lifted upward by the parts-lifting means and fed from the parts-sending portion to the first linear-transferring means. Accordingly, in the feeding process of parts, some of the parts circulate through the first linear-transferring means, the second linear-transferring means and the parts-lifting means. Namely, in the present invention, parts collected on the parts-collecting path of the second linear-transferring means pass over, by being lifted by the parts-lifting means, a connecting step to the parts-feeding path of the first linear-transferring means and are introduced into the first linear-transferring means.

With such a construction as in the above, parts are to be lifted by the parts-lifting means, whereby making it unnecessary to incline the parts-collecting path of the second linear-transferring means with respect to the parts-feeding path of the first linear-transferring means, therefore, it becomes possible to reject parts from any place on the parts-feeding path of the first linear-transferring means, and it becomes possible to form a long parts-screening portion. Consequently, it becomes possible to heighten the parts feeding rate without decreasing screening ability (screening rate and screening accuracy). In addition, the length of the parts-screening portion can be sufficiently secured, whereby making it possible to shorten the overall length of the first linear-transferring means, thus, the unit can be downsized. Furthermore, since it is unnecessary to incline the parts-collecting path with respect to the parts-feeding path, it becomes possible to, for example, arrange the parts-collecting path below the parts-feeding path, whereby the distance between the first linear-transferring means and second linear-transferring means can be sufficiently secured while providing a construction so that parts can be transferred between the parts-feeding path and the parts-collecting path, whereby maintainability in gap adjustment, etc., can be improved, and also problems such that parts and/or dust intruding in the gap between both in different vibrating modes, causing a motion failure can be prevented.

In particular, as a first invention, since the parts-collecting path of the second linear-transferring means is arranged, as a two-dimensional view (a plan view), approximately in parallel with respect to the parts-feeding path, it becomes possible to arbitrarily set the range for delivering parts between the parts-feeding path and parts-collecting path. Therefore, it becomes possible to freely design the length of the parts-screening portion on the parts-feeding path. In greater detail, by appropriately designing and replacing a vibrating body having the parts-feeding path of the first linear-transferring means or a detachable unit for parts-screening constructed as one portion of this vibrating body, unit construction can be simply altered according to the properties of parts to be fed and the feeding mode of parts without modifying the basic unit construction. Herein, "the arrangement, as a two-dimensional view, approximately in parallel" means an arrangement substantially in parallel when the unit is viewed from the top. For example, even if the parts-feeding path and the parts-collecting path are not parallel with each other in a strict sense, as long as both of the paths are closely arranged with each other so that it is possible to deliver parts throughout the whole length of a range where both are mutually juxtaposed, such a construction is included in the present invention.

In the present invention, it is preferable that said parts-collecting path is arranged, throughout its whole length, downward with respect to said parts-feeding path. According to this invention, since the parts-collecting path is, throughout its whole length, arranged downward with respect, to the parts-feeding path, the distance between the first linear-transferring means and the second linear-transferring means can be sufficiently secured while providing a construction so that parts can be transferred between both of the paths. Therefore, problems such that parts and/or dust intruding in the gap between both in different vibrating modes, causing a motion failure can be prevented. In addition, since the parts-collecting path is arranged downward, it becomes easy to provide a construction so that a drop distance of parts at a delivery from the second linear-transferring means to the parts-receiving portion of the parts-lifting means can be reduced. Therefore, the impact that parts receive can be suppressed and it also becomes possible to prevent damage to the parts.

Then, a vibratory parts-feeding unit of a second invention is characterized in that the parts-collecting path is, throughout its whole length, arranged downward with respect to the parts-feeding path. According to this invention, since the parts-collecting path is, throughout its whole length, arranged downward with respect to the parts-feeding path, it becomes possible to arbitrarily set the range for delivering parts between the parts-feeding path and parts-collecting path, therefore, it becomes possible to freely design the length of the parts-screening portion on the parts-feeding path. In addition, the distance between the first linear-transferring means and the second linear-transferring means can be sufficiently secured while providing a construction so that parts can be transferred between both of the paths, therefore, problems such that parts and/or dust intruding in the gap between both in different vibrating modes, causing a motion failure can be prevented. In addition, since the parts-collecting path is arranged downward, it becomes easy to provide a construction so that a drop distance of parts at a delivery from the second linear-transferring means to the parts-receiving portion of the parts-lifting means can be reduced, therefore, the impact that parts receive can be suppressed and it also becomes possible to prevent damage to the parts.

In the present invention, it is preferable that a first vibrating body on which said parts-feeding path is constructed and a second vibrating body on which said parts-collecting path is constructed are provided, and said first vibrating body is overhanging said second vibrating body. Thereby, parts can be smoothly transferred and mounted from the parts-feeding path via the parts rejecting portion and the like onto the parts-collecting path, and also it becomes possible to secure a great gap between both vibrating bodies, where both vibrating bodies are opposed horizontally below the overhanging portion. Therefore, maintainability is improved, and also a motion failure caused by, for example, contact between the first vibrating body and second vibrating body via dust, etc., can be prevented.

In the present invention, it is preferable that said parts-collecting path is arranged approximately in parallel with respect to said parts-feeding path when viewed in the up-and-down direction. According to this invention, since the parts-collecting path is arranged approximately in parallel with respect to the parts-feeding path when viewed in the up-and-down direction, delivery of parts from the parts-feeding path to the parts-collecting path becomes possible throughout nearly the whole length of a portion where the parts-feeding path and the parts-collecting path are juxtaposed. Therefore, a long parts-screening portion can be secured on the parts-feeding path and, also, it becomes possible to shorten the length of the unit in the parts feeding direction, whereby the unit can be downsized.

In the present invention, it is preferable that said parts-feeding path and said parts-collecting path are constructed to be approximately horizontal. According to this invention, the parts-feeding path and the parts-collecting path are both constructed to be almost horizontal, whereby it becomes possible to transfer parts by the first linear-transferring means and the second linear-transferring means without difficulty. Therefore, the transferring rate of parts can be heightened, thus it becomes possible to improve the feeding rate of parts.

In the present invention, it is preferable that said parts-lifting means is provided with a spiral parts-lifting path on the outer circumference thereof and transfers parts upward along said parts-lifting path. According to this invention, since the spiral parts-lifting path is provided on the outer circumference, the parts-lifting means can be constructed in a compact size, and also a construction can be provided so that the downstream end of the parts-collecting path directly faces onto the parts-receiving portion located at a lower portion of the parts-lifting means. Therefore, the drop distance of parts at a delivery of the parts can be reduced, whereby damage to the parts can be prevented. For example, in a case where a conventional bowl-shaped vibrating tray is used as parts-lifting means, it is necessary to provide a construction so that the parts-collecting path exceeds the upper edge of the vibrating tray, therefore, parts are easily damaged as they drop from the parts-collecting path arranged above the vibrating tray onto the inner bottom portion of the vibrating tray. In this case, it is desirable that the above parts-lifting means is a vibratory conveyer, which transfers parts along the parts-lifting path by vibration.

In the present invention, it is preferable that, on the first linear-transferring means, parts-discharging portions for discharging parts from said parts-feeding path are provided on both sides of said parts-feeding path, respectively. According to this invention, since the parts-discharging portions are provided on both sides of the parts-feeding path of the first linear-transferring means, screening of parts can be further easily performed. For example, on the parts-feeding path, a part, which overlaps with one side of a certain part, can be rejected to the parts-discharging portion on the said one side, and a part, which overlaps with the other side, can be rejected to the parts-discharging portion on the said other side. Therefore, the screening rate and screening accuracy can be heightened.

In this case, it is desirable that a parts-discharging path which passes below said parts-feeding path and faces onto said parts-collecting path of said second linear-transferring means is connected to said parts-discharging portion for discharging parts onto the side opposite to said second linear-transferring means out of said parts-discharging portions. Herein, in a prior circulating parts-feeding unit, a great difference in elevation (vertical interval) cannot be created between the parts-feeding path of the first linear-transferring means and the parts-collecting path of the second linear-transferring means, which are arranged in a mutually crossing fashion. If a great difference in elevation is created in the prior unit, the angle of inclination of the parts-collecting path of the second linear-transferring means becomes great, making collection of parts difficult and the first and second linear-transferring means long, and as a result, the overall length of the unit must be extended. Therefore, in the prior unit it is structurally impossible to guide parts from the parts-discharging portion for discharging parts onto the side opposite to the second linear-transferring means toward the parts-collecting path of the second linear-transferring means even if the parts-discharging portions are provided on both sides of the parts-feeding path.

Compared hereto, in the present invention, since it is unnecessary to arrange the parts-feeding path and the parts-collecting path in a crossing fashion, it becomes possible to secure a great difference in elevation between both, whereby an advantage is provided such that it becomes possible to guide parts discharged onto the side opposite of the second linear-transferring means to the parts-collecting path of the second linear-transferring means by passing these parts below the parts-feeding path.

In the above respective inventions, it is preferable that installation is carried out so that the parts-collecting path of the second linear-transferring means becomes approximately horizontal or declivitous. Since alignment of parts is unnecessary on the parts-collecting path, by carrying out installation so that the parts-collecting path becomes approximately horizontal or declivitous, parts can be speedily collected.

In addition, the parts-lifting means is not limited to a vibratory conveyer. A mechanical conveyer, a conveyer using fluid pressure (for example, a conveyer which conveys parts by using fluid pressure inside a tube) or the like can be used. Furthermore, the introducing position of parts may be on the parts-collecting path of the second linear-transferring means or on the parts-lifting path of the parts-lifting means.

In addition, in the above respective means, a first vibrating body on which the parts-feeding path is constructed and a second vibrating body on which the parts-collecting path is constructed are provided, and a first vibrating source is arranged below the first vibrating body and a second vibrating source is arranged below the second vibrating body in some cases. Herein, as each vibrating source, a vibrating source containing an electromagnetic driver (for example, a solenoid) can be used, however, in the respect where no influence due to electromagnetic fields is exerted on parts and, in addition, downsizing is possible, a vibrating source containing a piezoelectric driver (a member which produces vibration by a behavior of piezoelectric material) is preferable. In either case, a construction wherein each driving body and an elastic member (a flat spring, a coil spring or the like) are contained can be provided.

In this case, it is preferable to provide a difference in elevation between the installation height of the first vibrating body and the first vibrating source and the installation height of the second vibrating body and the second vibrating source in a manner roughly corresponding to the difference in elevation between the parts-feeding path and the parts-collecting path. The vibrating mode of each vibrating body is produced according to the driving mode of each vibrating source and the distance from each vibrating source to each vibrating body. Therefore, by reducing the difference in the above distance, it becomes possible to easily match the vibrating modes of the first vibrating body and the second vibrating body, thus a desirable correspondence between the parts feeding rate on the parts-feeding path and the parts collecting rate on the parts-collecting path can be obtained.

BRIEF DESCRIPTION OF DRAWINGS

FIG. 4A is a schematic section showing a condition where the same embodiment is cut along IVA—IVA line of FIG. 1, and FIG. 4B a schematic section showing a condition where the same is cut along IVB—IVB line of FIG. 1.

DESCRIPTION OF THE PREFERRED EMBODIMENTS

Figure 1:
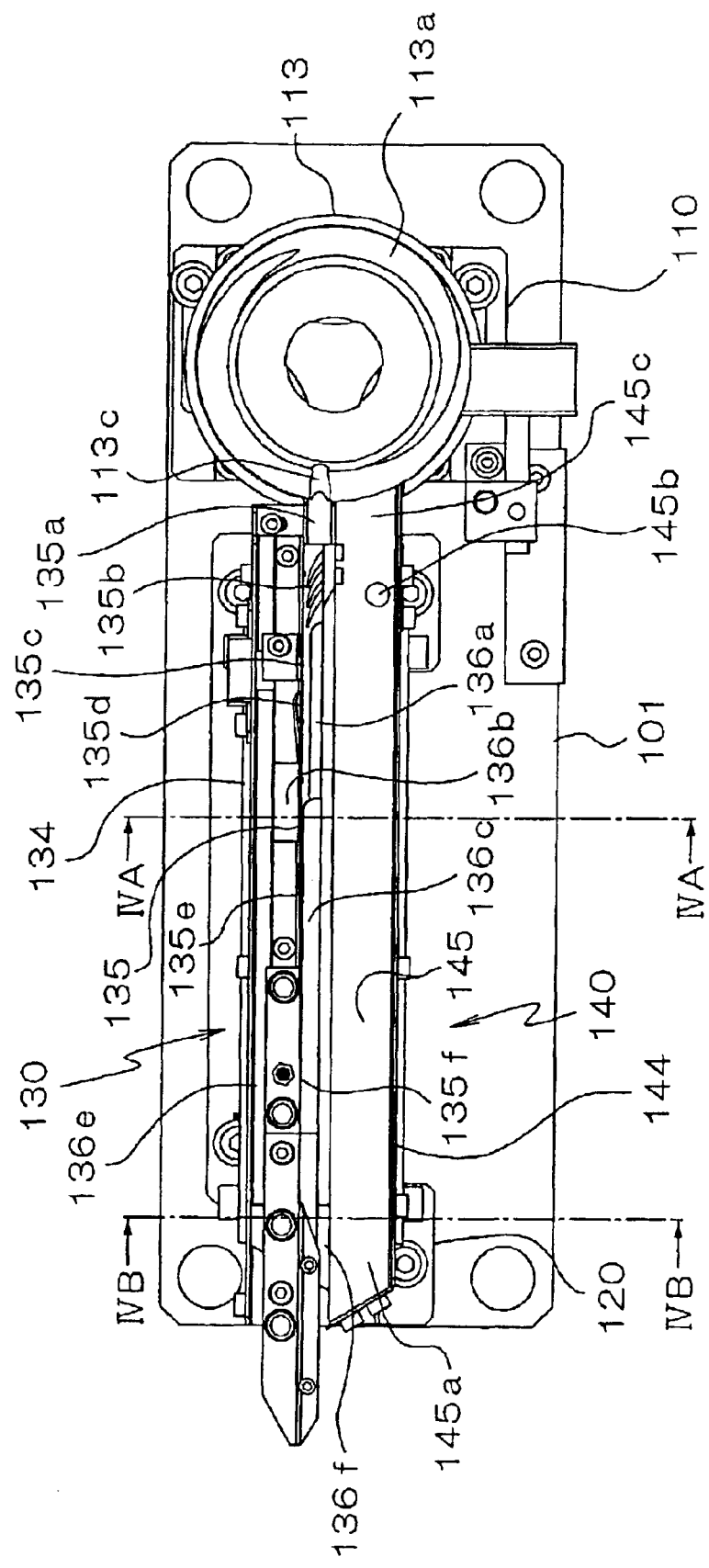
FIG. 1 is a schematic plan view showing a condition where an embodiment of a vibratory parts-feeding unit according to the present invention is viewed from the top.
Figure 2:
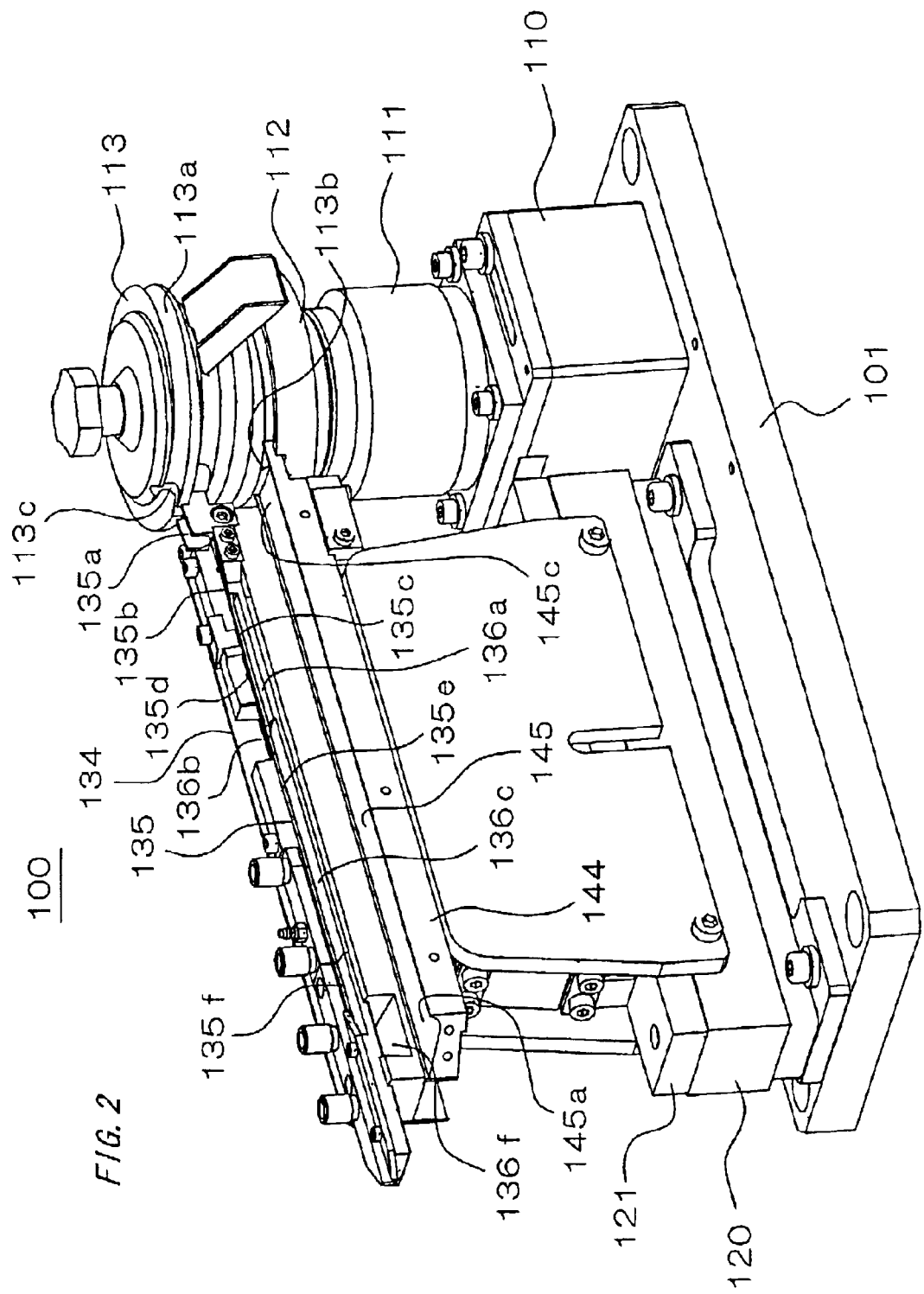
FIG. 2 is a schematic perspective view showing a condition where the same embodiment is diagonally viewed from the right side.
Figure 3:
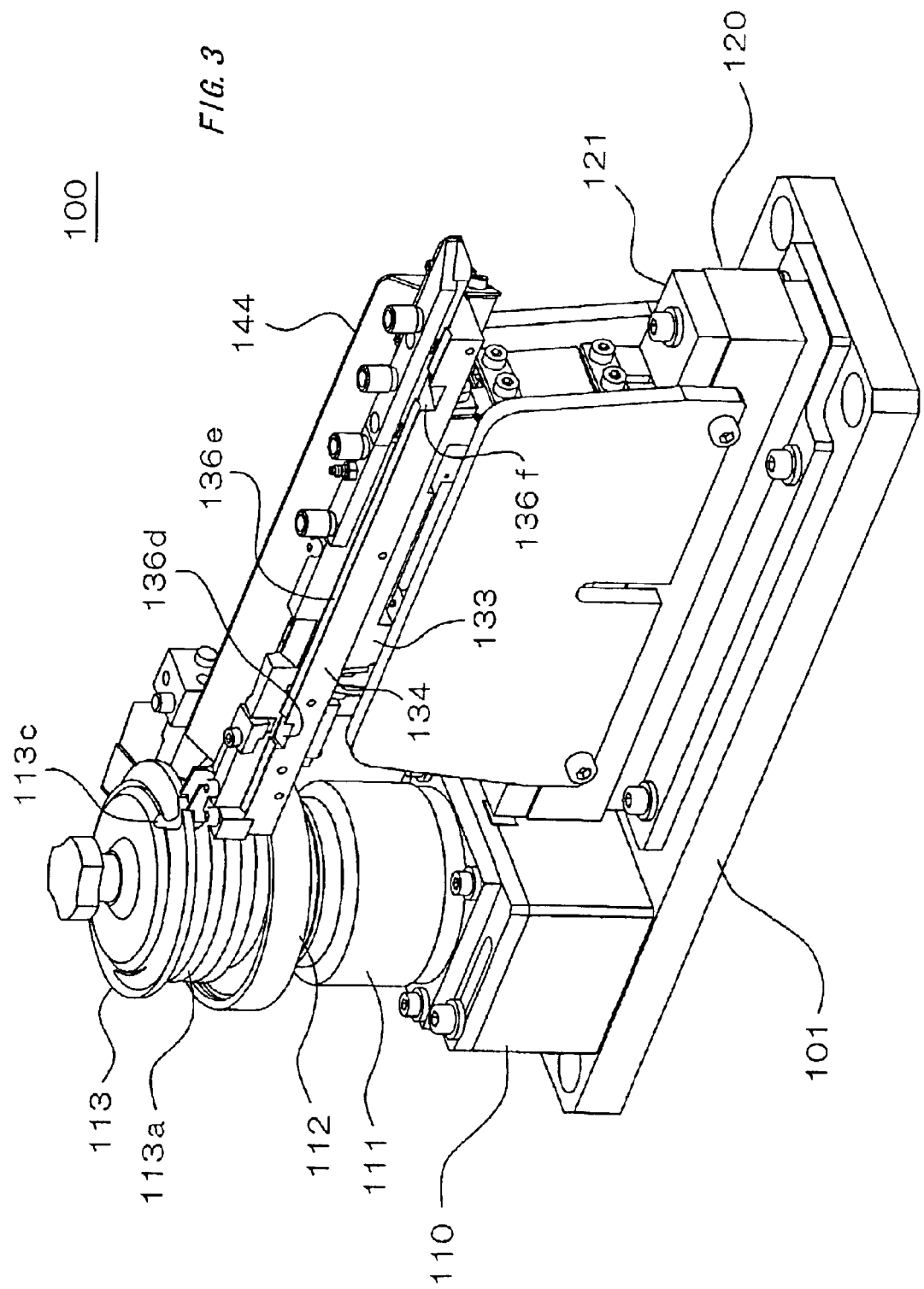
FIG. 3 is a schematic perspective view showing a condition where the same is diagonally viewed from the left side.

Now, an embodiment of a vibratory parts-feeding unit according to the present invention will be described in detail with reference to the attached drawings. FIG. 1 is a schematic plan view showing a condition where a vibratory parts-feeding unit 100 of the present embodiment is viewed from the top, FIG. 2 is a schematic perspective view showing a condition where the vibratory parts-feeding unit 100 is diagonally viewed from the right side, and FIG. 3 is a schematic perspective view showing a condition where the vibratory parts-feeding unit 100 is diagonally viewed from the left side. Herein, components to be fed in a vibratory parts-feeding unit of the present invention have no limitations, however, as appropriate parts to be fed by the parts-feeding unit of the present embodiment 100, for example, various electronic parts, in greater detail, capacitors, inductors, light emitting elements (LEDs, etc.), vibrating quartz crystal chips, surface acoustic wave elements, various semiconductor ICs and the like can be mentioned.

In this parts-feeding unit 100, a first base 110 and a second base 120 are fixed on a base 101, respectively, via a vibration-proof member such as a rubber vibration isolator or the like. A vibrator 111 is installed on the first base 110, and a trough 112 is attached on the vibrator 111. A vibrating body 113 is fixed to the trough 112. On the outer circumference of the vibrating body 113, a parts-lifting path 113a spirally extending from a lower parts-receiving portion 113b to an upper parts-sending portion 113c is provided.

Figure 5:
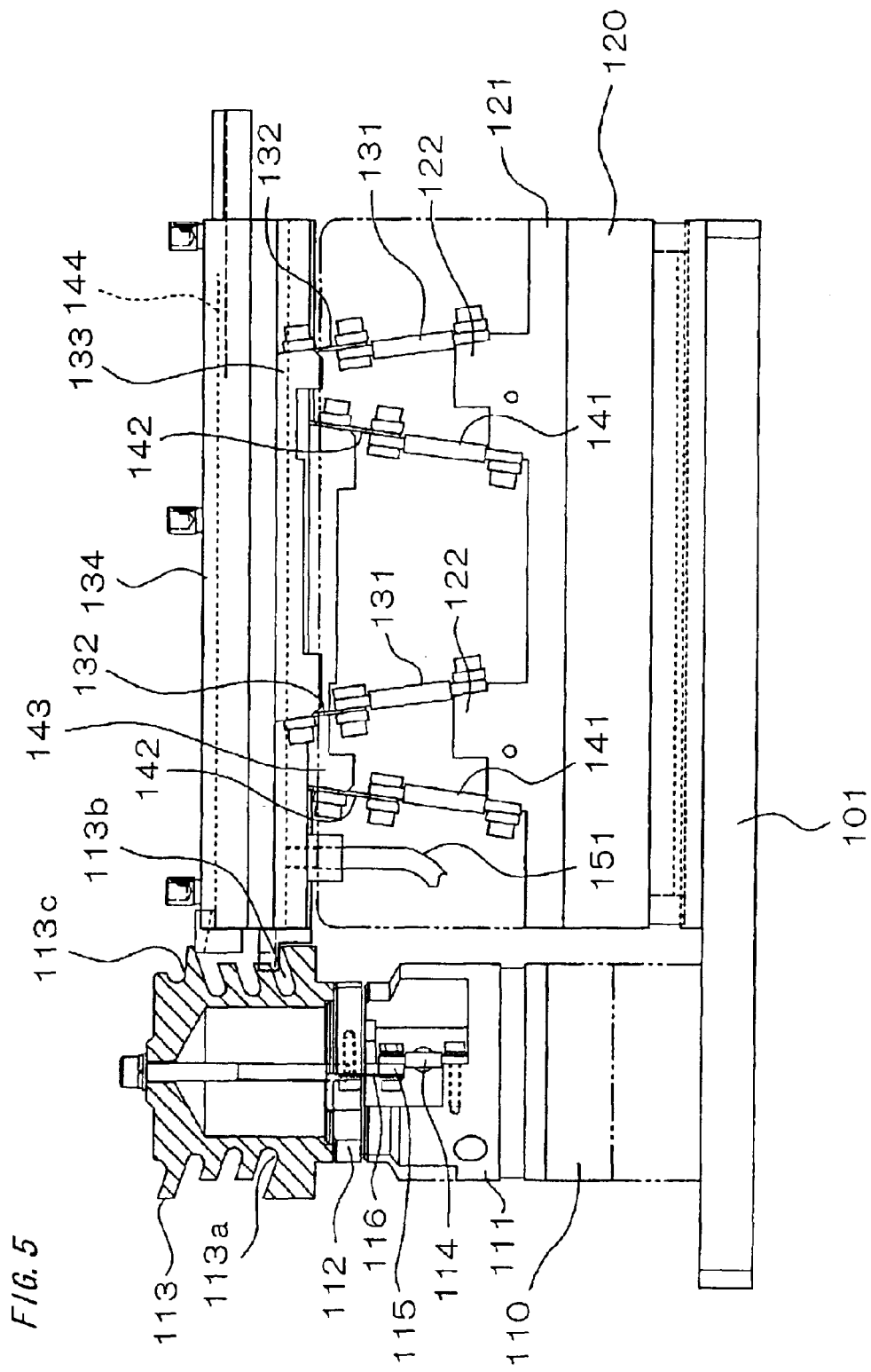
FIG. 5 is a longitudinal section of the same embodiment.

The above vibrator 111 has, as shown in FIG. 5, in a built-in manner, a piezoelectric body 114 whose lower end is fixed to the first base 110, a spacer 115 which is horizontally connected to the upper end of this piezoelectric body 114, and an elastic member 116, such as a flat spring, whose lower end is connected to the spacer 115. The upper end of the elastic member 116 is fixed to the above trough 112. The piezoelectric body 114 has a pair of electrodes formed on the front and back thereof, and is structured so as to be able to vibrate, by applying appointed high-frequency power between these electrodes, the trough 112 in the tangential direction around the axis line. In this vibrator 111, it is possible to adjust a drive frequency by altering the elastic modulus of the above elastic member 116. In addition, by changing the thickness of the above spacer 115 (the length measured in the horizontal direction), the vibration angle can be adjusted, thus vibration appropriate to an angle of inclination of the above spiral parts-lifting path 113a can be obtained.

Figure 6:
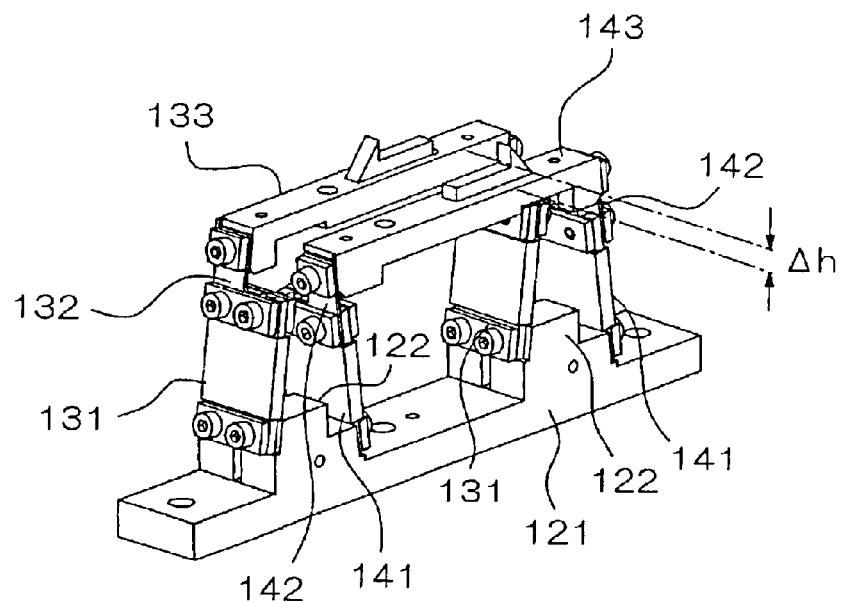
FIG. 6 is a schematic perspective view showing a vibratory drive part of a first linear-feeder and a second linear-feeder of the same embodiment.

On the second base 120, a feeder-attaching member 121 is fixed. On this feeder-attaching member 121, a first linear-feeder 130 and a second linear-feeder 140 are juxtaposed. The first linear-feeder 130 comprises, as shown in FIG. 5 and FIG. 6, inclined piezoelectric bodies 131, 131 whose lower ends are connected to the above feeder-attaching member 121, inclined elastic members 132, such as flat springs, to the lower ends of which the upper ends of these piezoelectric bodies 131 are connected, a trough 133 to which the upper ends of these elastic members 132 are connected, and a first vibrating body 134 which is fixed on this trough 133. In addition the second linear-feeder 140 comprises inclined piezoelectric bodies 141, 141 whose lower ends are connected to the feeder-attaching member 121, inclined elastic members 142, such as flat springs, to which the upper ends of these piezoelectric bodies 141 are connected, a trough 143 to which the upper ends of the elastic members 142 are connected, and a second vibrating body 144 which is fixed on this trough 143. The troughs 133 and 143 are constructed in a condition where they are installed in parallel with each other. The first linear-feeder 130 and the second linear-feeder 140 are constructed so that, by applying high-frequency power to the above piezoelectric bodies 131 and 141, the first vibrating body 134 and the second vibrating body 144 are linearly vibrated so as to have mutually opposite transferring directions.

The above piezoelectric body 131 is attached to a step part 122 projecting upwardly on the above feeder-attaching member 121, and the attaching position of the piezoelectric body 131 is set slightly higher than the attaching position of the piezoelectric body 141. In addition, the upper surface of the trough 133 is arranged higher than the upper surface of the trough 143 by a difference in elevation of (h. This difference in elevation of (h is almost identical with a difference in elevation between a parts-feeding path 135 and a parts-collecting path 145, which will be described later. Hereby, the first linear-feeder 130 is arranged higher than the second linear-feeder 140, and due to this difference in elevation, a difference in elevation is provided between the first vibrating body 134 and second vibrating body 144, therefore, the difference in vibrating condition (amplitude) between the first vibrating body 134 and second vibrating body 144 can be reduced.

On the first vibrating body 134 of the first linear-feeder 130, a parts-feeding path 135 extending in the longitudinal direction is formed. On the parts-feeding path 135, a parts-introducing portion 135a which receives parts from the parts-sending portion 133c of the parts-lifting path 133a formed on the said vibrating body 113, an aggregation portion 135b which has been grooved so that parts received at the parts-introducing portion 135a are aggregated at the central part of the parts-feeding path, a dust-and-dirt-removing portion 135c which is opened on the parts-feeding path 135 and is provided with a opening for discharging dust narrower than the width (thickness) of parts, a separating portion 135d which is provided with a temporary shelter for parts, which has function to take piled-up parts apart, an open aligning portion 135e having a groove opened upward to convey parts in a line continuously from the separating portion 135d, and a closed aligning portion 135f having a projecting edge above a groove are provided in order.

In addition, on the sides of the parts-feeding path 135, a first parts-discharging portion 136a is formed on the left side with respect to a transferring direction, in the range from the above dust-and-dirt-removing portion 135c via the separating portion 135d to the open aligning portion 135e. In addition, a second parts-discharging portion 136b is formed on the right side with respect to a transferring direction, in the upstream section of the above open aligning portion 135e. Furthermore, a third parts-discharging portion 136c is formed on the left side with respect to a transferring direction, in the range from the downstream area of the open aligning portion 135e to the close aligning portion 135f.

The above first parts-discharging portion 136a and the third parts-discharging portion 136c both directly face onto a parts-collecting path 145 (which will be described later) of the adjacent second linear-feeder 140 and are constructed so as to discharge parts from the parts-feeding path 135 to the parts-collecting path 145. In addition, as shown in FIG. 3 and FIG. 4A, the above second parts-discharging portion 136b is connected to a parts-discharging path 136e constructed so as to extend in parallel with the parts-feeding path 135 on the opposite side of the second linear-feeder 140. This parts-discharging path 136e is connected, as shown in FIG. 3 and FIG. 4B, to a parts-discharging path 136f which passes below the parts-feeding path 135, and this parts-discharging path 136f is, as shown in FIG. 1 and FIG. 2, constructed so as to face onto the above parts-collecting path 145. Accordingly, a construction is provided so that parts discharged from the parts-feeding path 135 to the parts-discharging path 136b pass through the above parts-discharging paths 136e and 136f and shift to the parts-collecting path 145.

On the other hand, a parts-collecting path 145 extending in the longitudinal direction is formed on the vibrating body 144 of the second linear 140. This parts-collecting path 145 is arranged lower than the above parts-feeding path 135 and formed approximately in parallel with the parts-feeding path 135. The parts-collecting path 145 has an upstream portion 145a onto which the above parts-discharging path 136f faces and a downstream portion 145c which faces onto the parts-receiving portion 113b of the parts-lifting path 113a on the above vibrating body 113. In addition, a blowing port 145b for static eliminating air is provided in the vicinity of the downstream portion 145c. This blowing port 145b is composed of fine pores (or a mesh-like opening portion), connected to a static eliminating hose 151 (shown in FIG. 5) drawn out from an ionizer (unillustrated), and can blow ionized air onto parts to eliminate static electricity of the parts.

Into the parts-collecting path 145, parts rejected through screening are introduced from the above parts-discharging portions 136a and 136c, and these parts are transferred in the direction opposite to that of the above parts-feeding path 135 and are, in the course of time, sent out to the parts-receiving portion 133b on the vibrating body 113. Herein, in a case where parts are continuously fed, it is also possible to provide a construction so that new parts are introduced into the parts-collecting path 145 from parts-introducing means such as a parts hopper (unillustrated). In addition, parts may be introduced from the parts-introducing means into the parts-lifting path 113a of the vibrating body 113 as parts-lifting means. Furthermore, parts may be introduced into both the parts-collecting path and parts-lifting path.

As in the above, in the parts-feeding unit 100 of the present embodiment, parts on the parts-collecting path 145 of the second linear-feeder 140 are transferred toward the vibrating body 113 constructed as at least one portion of parts-lifting means and mounted on the parts-receiving portion 113b on the vibrating body 133. On the vibrating body 113, parts gradually rise along the parts-lifting path 113a, and in the course of time, the parts are transferred and mounted from the parts-sending portion 113c onto the parts-feeding path 135 of the first linear-feeder 130. The parts on the parts-feeding path 135 are aligned while gradually screened and are, in the course of time, transferred with an appointed posture in a line. Parts rejected from the parts-feeding path 135 slip down on the parts-collecting path 145 of the second linear-feeder 140 and are transferred toward the vibrating body 113 as in the above.

In the present embodiment, by providing the vibrating body of parts-lifting means, restrictions on the positional relationship in the height direction between the parts-feeding path 135 of the first linear-feeder 130 and the parts-collecting path 145 of the second linear-feeder 140 are considerably reduced. In this case, if the parts-collecting path 145 is arranged lower than several sections of the parts-feeding path 135, which face onto the parts-discharging portions 136a, 136b, and 136c, parts rejected from the parts-feeding path 135 can be returned to the parts-collecting path 145. And, in the present embodiment, the parts-collecting path 145 is, throughout its whole length, arranged lower than the parts-feeding path 135, whereby making it possible, throughout the whole length of the range where the parts-feeding path 135 and the parts-collecting path 145 are juxtaposed, to deliver parts from the parts-feeding path 135 to the parts-collecting path 145. Thus, a long parts-screening portion for parts screening to be performed in a process for aligning parts can be secured. Therefore, parts can be fed in a highly efficient and highly accurate manner at a high speed. In addition, since portions other than the indispensable parts-screening portion can be curtail, the parts-feeding unit can be constructed with a short overall length, and then this short length thereof make it possible to achieve downsizing of the unit as a whole.

Figure 7:
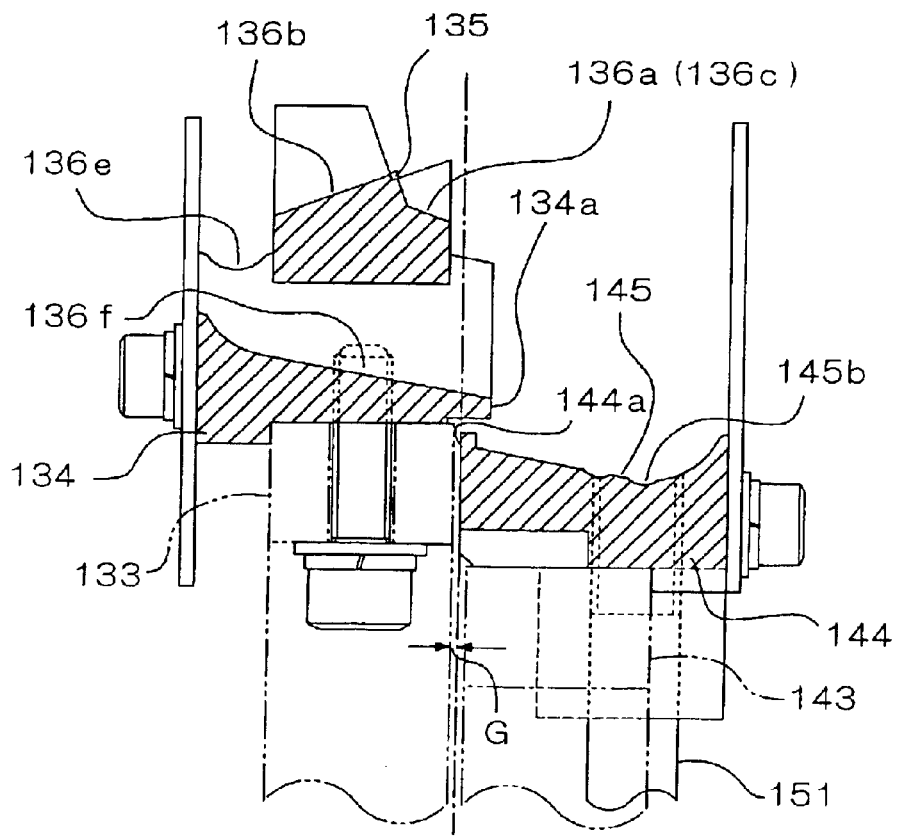
FIG. 7 is an enlarged partial section schematically showing the sectional structure of a first vibrating body and a second vibrating body of the same embodiment.

In addition, in the parts-feeding unit 100 of the present invention, it is possible to provide the parts-collecting path lower than the parts-feeding path 135, therefore, as shown in FIG. 7. Therefore, it has become possible, throughout the whole length in the parts feeding direction (or almost all the length range), to provide a construction so that a side edge 134a of the first vibrating body 134 overhangs a side edge 144a of the second vibrating body 144. Accordingly, parts can be securely delivered from the first vibrating body 134 to the second vibrating body 144, and a great gap G of the opposed portion between the first vibrating body 134 and the second vibrating body 144 can be also secured, therefore, it becomes possible to improve maintainability in gap adjustment, etc., and also to prevent a situation such that parts and/or dust stuck in this gap G causes a motion failure from arising. In addition, the first vibrating body 134, which overhangs the second vibrating body 144, also provides an advantage such that part and/or dust hardly drop in the above gap G.

Furthermore, in the present invention, in order to reject parts from the parts-feeding path 135, the parts-discharging portions 136a, 136b, and 136c are provided on both sides of the parts-feeding path 135. Thereby, when one part is transferred on the parts-feeding path 135, it becomes possible to promptly reject even another part which overlaps on either side of said one part, therefore, the screening rate, screening efficiency, and screening accuracy, etc., can further be improved. In addition, in terms of the parts-discharging portion 136b, which is constructed so as to reject parts onto the side opposite to the parts-collecting path 145, parts are guided to the parts-collecting path 145 via the parts-discharging path 136f, which passes below the parts-feeding path 135. This becomes possible only when, as in the present invention, a construction has been provided so that an arbitrary difference in elevation between the parts-feeding path 135 and parts-collecting path 145 can be secured.

In the present embodiment, since it is unnecessary to provide an angle of inclination between the parts-feeding path 135 and parts-collecting path 145, the conveying rate can be heightened by making both the parts-feeding path and parts-collecting path horizontal, for example.

In the present embodiment, since both the first linear-feeder 130 and second linear-feeder 140 (in addition hereto, the parts-lifting means composed of the vibrating body 113, as well) use the piezoelectric body as a vibratory drive source, problems such as magnetization of parts which occurs when a magnetic solenoid is used can be avoided.

In the present invention, since the vibrating body 113 having the spiral parts-lifting path 113a on the outer circumference thereof is used as parts-lifting means, as compared to the case where a vibrating tray is used, it becomes possible to make the downstream end of the parts-collecting path 145 directly face onto the parts-receiving portion located at a lower position, therefore, the obstacle (the upper edge of the bowl-shaped tray, etc.,) to an arrangement wherein the parts-collecting path 145 becomes lower than the parts-feeding path is eliminated and also a drop distance at a delivery of parts from the parts-collecting path 145 to the vibrating body 113 can be reduced, thus damage to the parts can be prevented.

Herein, the vibratory parts-feeding unit of the present invention is not limited to only the aforementioned illustrated examples, and as a matter of course, various modifications can be made therein as long as it does not depart from the spirit of the present invention. For example, in the above embodiment, a vibratory conveyer is used as the parts-lifting means, however, any parts-lifting means may be used as long as it can lift parts from a lower position to an upper position.

The entire disclosure of Japanese Patent Application No. 2002-005926 filed on Jan. 15, 2002 including specification, claims, drawings and summary are incorporated herein by reference in its entirety.

What is claimed is:

1. A vibratory feeder apparatus for orienting and feeding parts comprising:
a first vibratory feeding path for moving parts in a linear direction from an upstream end to a downstream end of said first feeding path,
a second vibratory feeding path having an upstream end and a downstream end arranged for moving parts from said upstream end to said downstream end of said second feeding path in a linear direction opposite to said linear direction of said first vibratory path with said second path located alongside of said first path,
a parts lifting mechanism for raising parts from said downstream end of said second vibratory feeding path to said upstream end of said first vibratory feeding path, and
means positioned along said first vibratory feeding path for diverting to said second vibratory feeding path parts which are not in a predetermined orientation, said second vibratory feeding path being positioned at a lower level than said first vibratory feeding path; and at least a portion of said first vibratory feeding path extends over said second vibratory feeding path.

2. The vibratory feeder apparatus of claim 1 in which first vibratory feeding path extends parallel to said second vibratory feeding path.

3. The vibratory feeder apparatus of claim 1 in which said first and second vibratory feeding paths are approximately horizontal.

4. The vibratory feeder apparatus of claim 1 in which said parts lifting mechanism includes a spiral shaped parts lifting path.

5. The vibratory feeder apparatus of claim 1 in which said means positioned along said first vibratory feeding path for diverting parts to said second vibratory feeding path includes discharge paths on opposite linear sides of said first vibratory path.

6. The vibratory feeder apparatus of claim 5 in which one of said discharge paths leads from one linear side of said first vibratory feeder path which is remote from said second vibratory feeder and extends below said first vibratory feeder path to divert parts to said second vibratory feeder path.

7. A vibratory feeder apparatus for orienting and feeding parts comprising:
a first vibratory feeding path for moving parts in a linear direction from an upstream end to a downstream end of said first feeding path,
a second vibratory feeding path having an upstream end and a downstream end arranged for moving parts from said upstream end to said downstream end of said second feeding path in a linear direction opposite to said linear direction of said first vibratory path with said second path located alongside of said first path,
a parts lifting mechanism including a spiral shaped parts lifting path for raising parts from said downstream end of said second vibratory feeding path to said upstream end of said first vibratory feeding path, and means positioned along said first vibratory feeding path for diverting to said second vibratory feeding path parts which are not in a predetermined orientation.

8. The vibratory feeder of claim 7 in which said second vibratory feeding path is positioned at a lower level than said first vibratory feeding path.

9. The vibratory feeder apparatus of claim 8 in which at least a portion of said first vibratory feeding path extends over said second vibratory feeding path.

10. The vibratory feeder apparatus of claim 7 in which first vibratory feeding path extends parallel to said second vibratory feeding path.

11. The vibratory feeder apparatus of claim 7 in which said first and second vibratory feeding paths are approximately horizontal.

12. The vibratory feeder apparatus of claim 7 in which said means positioned along said first vibratory feeding path for diverting parts to said second vibratory feeding path includes discharge paths on opposite linear sides of said first vibratory path.

13. The vibratory feeder apparatus of claim 12 in which one of said discharge paths leads from one linear side of said first vibratory feeder path which is remote from said second vibratory feeder and extends below said first vibratory feeder path to divert parts to said second vibratory feeder path.

14. A vibratory feeder apparatus for orienting and feeding parts comprising:
a first vibratory feeding path for moving parts in a linear direction from an upstream end to a downstream end of said first feeding path, a second vibratory feeding path having an upstream end and a downstream end arranged for moving parts from said upstream end to said downstream end of said second feeding path in a linear direction opposite to said linear direction of said first vibratory path with said second path located alongside of said first path, a parts lifting mechanism for raising parts from said downstream end of said second vibratory feeding path to said upstream end of said first vibratory feeding path, and means positioned along said first vibratory feeding path for diverting to said second vibratory feeding path parts which are not in a predetermined orientation including discharge paths on opposite linear sides of said first vibratory path.

15. The vibratory feeder of claim 14 in which said second vibratory feeding path is positioned at a lower level than said first vibratory feeding path.

16. The vibratory feeder apparatus of claim 15 in which at least a portion of said first vibratory feeding path extends over said second vibratory feeding path.

17. The vibratory feeder apparatus of claim 14 in which first vibratory feeding path extends parallel to said second vibratory feeding path.

18. The vibratory feeder apparatus of claim 14 in which said first and second vibratory feeding paths are approximately horizontal.

19. The vibratory feeder apparatus of claim 14 in which said parts lifting mechanism includes a spiral shaped parts lifting path.

20. The vibratory feeder apparatus of claim 14 in which one of said discharge paths leads from one linear side of said first vibratory feeder path which is remote from said second vibratory feeder and extends below said first vibratory feeder path to divert to said second vibratory feeder path.

* * * * *